Figure 1:
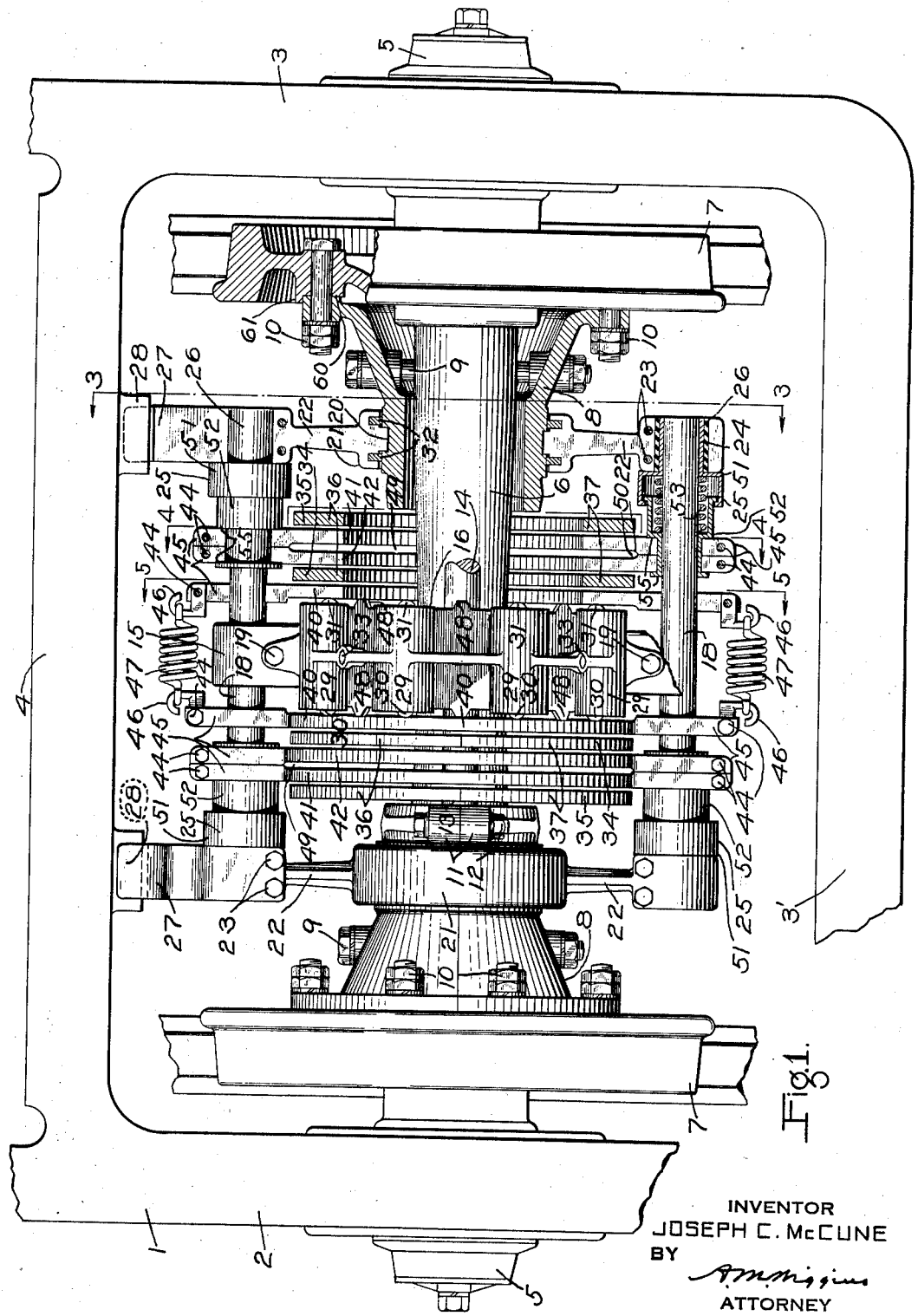

Sept. 26, 1939.  J. C. McCUNE  2,174,404
BRAKE MECHANISM
Filed Jan. 15, 1938  4 Sheets-Sheet 1

INVENTOR
JOSEPH C. McCUNE
BY
*A. M. Higgins*
ATTORNEY

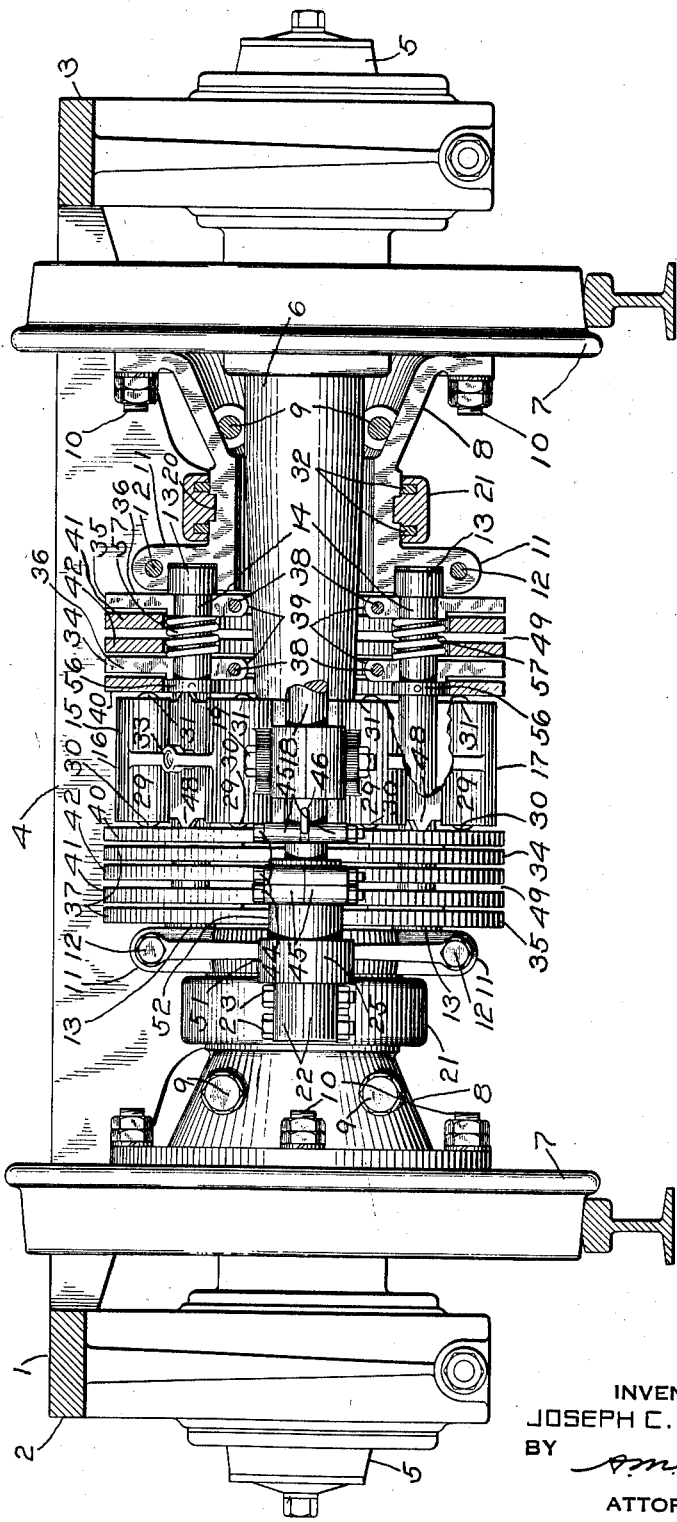

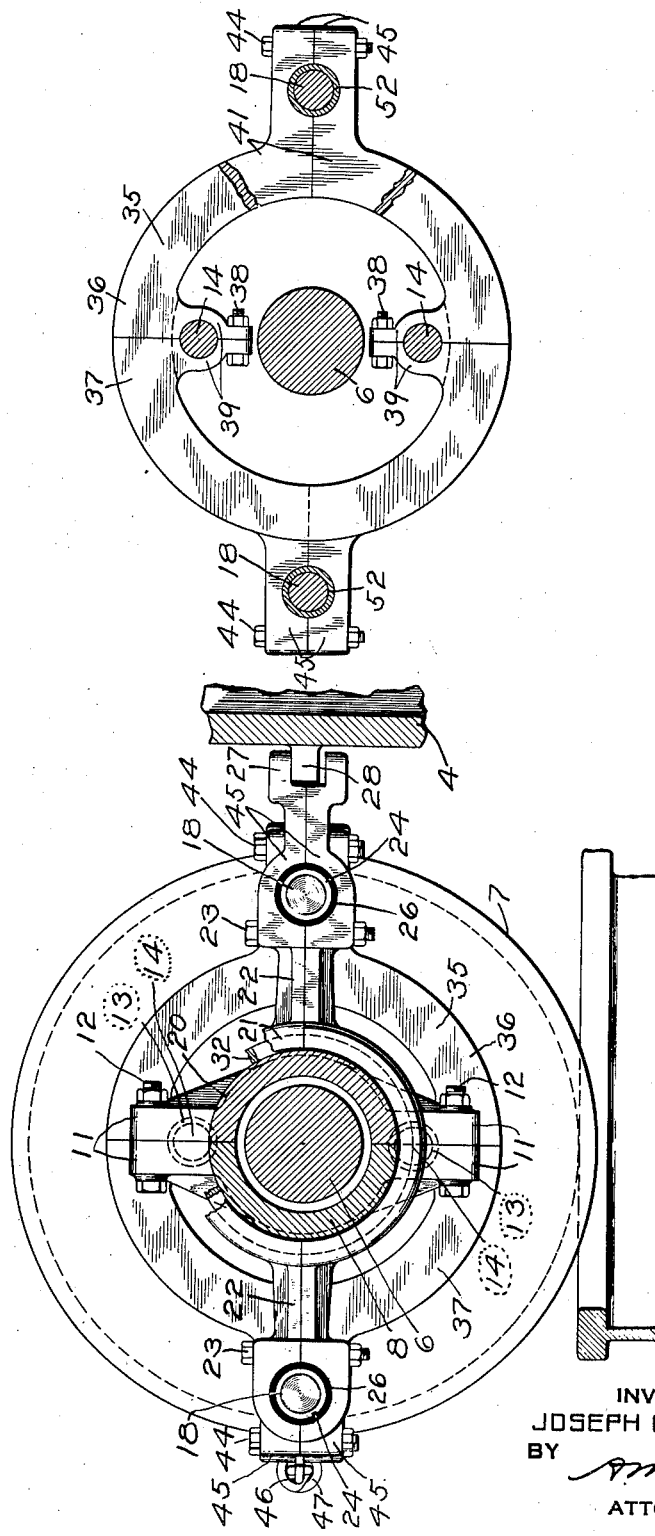

Sept. 26, 1939.   J. C. McCUNE   2,174,404
BRAKE MECHANISM
Filed Jan. 15, 1938   4 Sheets-Sheet 4
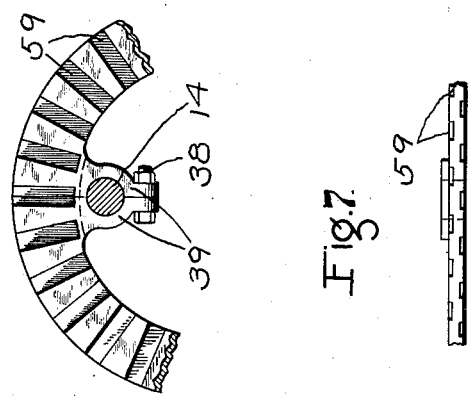
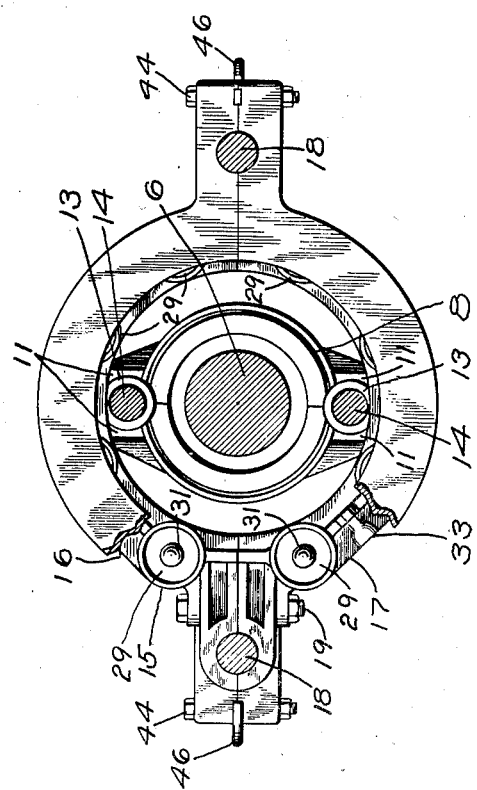
INVENTOR
JOSEPH C. McCUNE
BY
*A. M. Wiggins*
ATTORNEY Patented Sept. 26, 1939

2,174,404

UNITED STATES PATENT OFFICE 2,174,404

BRAKE MECHANISM

Joseph C. McCune, Edgewood, Pa., assignor to The Westinghouse Air Brake Company, Wilmerding, Pa., a corporation of Pennsylvania Application January 15, 1938, Serial No. 185,179

29 Claims. (Cl. 188—59)

This invention relates to brake mechanisms for railway vehicles or the like and more particularly to the friction disk type for use on wheel and axle assemblies of a vehicle truck.

In the pending application of Clyde C. Farmer and myself, Serial No. 170,240, filed on October 21, 1937, there is disclosed a brake mechanism of the above type which encircles the axle of a wheel and axle assembly and which embodies rotatable and non-rotatable friction brake elements carried by the axle and means also carried by the axle for causing said elements to frictionally engage each other in order to brake the wheel and axle assembly and for causing the elements to disengage for releasing said assembly.

One object of the present invention is to provide an improved disk brake mechanism of the above general type adapted to be secured to the wheels of a wheel and axle assembly whereby the weight of the mechanism is substantially all carried by the wheels and whereby in braking the wheels, the braking torque is transmitted directly from said mechanism to the wheels.

Another object of the invention is to provide an improved disk brake mechanism adapted to be wholly carried by the wheels of a wheel and axle assembly and embodying a plurality of interleaved rotatable and non-rotatable friction brake elements disposed on opposite sides of a fluid pressure operated brake cylinder assembly through the medium of which the operation of said elements to brake said wheels is adapted to be controlled.

Heretofore disk brake mechanisms of the type embodying a plurality of interleaved rotatable and non-rotatable friction brake elements have been impractical due to excessive heating, and another object of the invention is to provide a disk brake mechanism having improved means for dissipating heat so as to thereby obviate the above difficulty.

Still another object of the invention is to provide in a disk brake mechanism of the type having interleaved rotatable and non-rotatable brake elements, and improved means for disengaging said elements from each other and for holding same in spaced relation when the brakes are released.

Other objects and advantages will be apparent from the following more detailed description of the invention.

In the accompanying drawings; Fig. 1 is a plan view, partly in section, of a portion of a railway vehicle truck embodying the invention; Fig. 2 is an end view partly in section of the truck and brake mechanism shown in Fig. 1; Figs. 3, 4 and 5 are sectional views taken on the lines 3—3, 4—4, and 5—5, respectively, in Fig. 1; and Figs. 6 and 7 are a face view and an edge view, respectively, of a portion of a modified disk brake shoe which may be employed in the brake mechanism disclosed in Figs. 1 to 5.

As shown in Figs. 1 and 2 of the drawings, the invention is embodied in a railway vehicle truck which may comprise a truck frame 1 of any desired construction but which for the purpose of illustration is of the cast type having spaced parallel side frames 2 and 3 connected at their ends by transversely extending end members 3' and adjacent the transverse center line of the truck said frames are connected together by spaced, parallel, transversely extending transoms 4, only one end member and transom being shown.

The truck frame 1 is mounted on the usual journal boxes 5 in which is rotatively mounted the ends of an axle 6 and secured to said axle in any suitable manner and in the usual spaced relation are wheels 7. Only one wheel and axle assembly and the associated journal boxes are shown as these parts are deemed sufficient for a clear understanding of the invention. On the inside face of each wheel 7 there is provided a raised annular rib 60 having around its outer edge an annular shoulder 61 formed concentric with the wheel.

A spool like element 8 formed of two complementary parts encircling the axle 6 and secured together by bolts 9 is slidably mounted within the shoulder 61 against the rib 60 on each wheel and is secured to the wheel in concentric relation therewith by bolts 10, it being noted that said elements are secured to the wheels substantially closer to the periphery than to the axes of the wheels, these points of securing constituting braking force transmitting connections having relatively long lever arms.

The spools 8 are provided at their inner ends with two oppositely disposed radial arms 11 formed in two sections, one section on each part of the spool and said two sections are rigidly clamped together by bolts 12. Each of these arms is provided with a bore half of which is formed in each of the two sections of the arms, and rigidly clamped in these bores in one of the spools are enlarged heads 13 of two brake rods 14, like heads on the other ends of said rods being clamped in the other spool 8 in a like manner. These rods are thus disposed diametrically opposite each other on opposite sides of axle 6 and in parallel relation to the axis of said axle, and it will be noted that these rods and the spools 8 form a rigid connection between the wheels.

An annular brake cylinder device 15 comprising upper and lower complementary segmental sections 16 and 17 is disposed substantially midway between the wheels 7 and extends transversely of the axle 6 encircling said axle and the brake rods 14. The two sections of the brake cylinder device 15 are rigidly clamped together and to diametrically opposite rods 18 arranged parallel to the axis of the axle 6 by bolts 19.

Each of the spools 8 is provided between the arms 11 and the adjacent wheel 7 with an annular bearing 20 upon which is journaled a bearing member 21 having two oppositely disposed radial arms 22, said members and arms being formed in two complementary sections rigidly secured together and to the ends of the rods 18 by bolts 23. A bore is provided in each of the arms 22 into which one end of one of the rods 18 extends, and encircling the portion of the rod within said bore is the sleeve portion 24 of a spring cage 25 which sleeve portion is in turn encircled by a shock absorbing bushing 26 made of rubber or the like, the several rods, sleeves and bushings being securely clamped in the arms 22 by the bolts 23 above referred to.

One arm 22 of each of the bearing members 21 is provided with a jaw 27 extending radially outwardly from the axle 6 and into each of these jaws loosely fits a tongue 28 projecting from any suitable portion of the truck frame 1 such as the transom 4, these jaws and tongues being provided to secure the rods 18 and thereby the brake cylinder device 15 and other parts to be hereinafter described, against rotation with the axle 6.

From the above description it will be noted that the brake rods 14 secured to the inner ends of the spools 8 are adapted to rotate with the wheels 7, while the rods 18 and brake cylinder device 15 carried thereby are carried by the members 21 which are journaled on said spools and secured against rotation by the interengagement of tongues 28 and jaws 27. It will be further noted that the bearings 20 on spools 8 are recessed for engagement with members 21 thereby securing the rods 18 and brake cylinder device 15 against movement longitudinally of axle 6. A dust protector 32, preferably in the form of a felt ring, is secured in the bearing members 20 each side of bearings 20 and engages the spools 8 to keep foreign matter from said bearings.

Each portion 16 and 17 of the brake cylinder device 15 is provided with a plurality of spaced, small brake cylinders 29 arranged radially around the axle 6 and with their axes arranged parallel to the axis of said axle. Each of the brake cylinders 29 contain two circular oppositely facing pistons (not shown) which are movable outwardly in opposite directions parallel to the axis of axle 6 by fluid under pressure to effect an application of brakes and which are movable inwardly toward each other upon the relief of fluid under pressure to effect a release of the brakes. One piston in each brake cylinder device has a stem 30 projecting slightly beyond one side of the brake cylinder device while the other piston in said device has a like stem 31 projecting slightly beyond the opposite face of said device. Fluid conductors 33 are provided in the casing of the brake cylinder device 15 connecting the brake cylinder 29 together in pairs, these conductors extending to the exterior of the casing, and through said conductors fluid under pressure is adapted to be supplied to and released from the several brake cylinders 29 in any desired manner. The brake cylinder and piston arrangement just described may, if desired, be the same as that fully disclosed in the aforementioned pending application and in view of this and the fact that the piston stems 30 and 31 are shown, further detailed showing of this arrangement is not deemed essential to a clear understanding of the invention and has therefore been omitted.

A plurality of annular disk like brake elements 34 and 35 are provided at each side of the brake cylinder device 15 in parallel relation to each other and to said device and between the two rods 18 but surrounding the rods 14. Each of these elements may if desired be identical to the other and is formed in two complementary sections 36 and 37 rigidly secured to each other by bolts 38 provided through oppositely arranged inwardly directed projections 39 which are slidably mounted on the rods 14.

An annular, non-rotatable disk like braking element 40 is disposed between each side of the brake cylinder device 15 and the adjacent rotatable brake element 34, while an annular disk like non-rotatable brake element comprising two spaced elements 41 and 42 is disposed between each of the rotatable elements 34 and 35. Each of the elements 40, 41 and 42 is formed in two substantially semi-circular parts which are rigidly secured to each other by bolts 44 provided through outwardly extending projections 45 which are slidably mounted on the rods 18 for holding the elements in concentric alignment with the elements 34 and 35 and also against rotation.

A hook 46 is provided at the end of each of the projections 45 of elements 40 and a spring 47 under tension is connected to each two adjacent hooks, the springs 47 acting to pull said elements toward the opposite side of the brake cylinder device 15 into engagement with spaced stops 48 thereon which define the brakes released position of the two elements.

The two elements 41 and 42 are spaced apart to provide clearance space 49 between the elements for the flow of heat dissipating air currents. This spacing of the elements may be obtained in various ways but it is preferred to thicken the projections 45 as shown at 50 whereby upon arranging the two elements oppositely to each other the engagement of the thickened portions defines the desired spacing of the elements.

Each of the spring cages 25 comprises two telescoping parts 51 and 52, the part 51 being formed integral with sleeve 24 which is clamped in the respective bearing member 22, while the part 52 is slidably mounted on the respective bar 18 and has at one end an out-turned collar slidably mounted within the part 51 and adapted to engage an in-turned collar on part 51 for limiting outward movement thereof relative to the part 51. A spring 53 is provided in each spring cage 25 encircling the bar 18 and acting on the two parts of said cage for urging them apart and for opposing collapse thereof.

The part 52 of each of the spring cages 25 has an outer portion of reduced diameter slidable on the respective rod 18 and extending through a suitable bore in the adjacent projections 45 of the two brake elements 41 and 42, outwardly flaring flanges 55 being provided at each end of said portion of reduced diameter engaging the outer faces of said projections for rigidly securing the brake elements 41 and 42 against each other and to the portion 52 of the spring cage 25. The brake elements 41 and 42 are thus movable with portion 52 of the spring cages 25, and when said portions of the cages are moved to their most outwardly position by springs 53, the release position of the brake elements 41 and 42 is obtained.

A collar or stop 56 is secured to each of the rods 14 at each side of the brake cylinder device 15 for engagement by the inwardly directed projections 39 of the brake elements 34 to define the release position of said elements substantially midway between and therefore disengaged from the two adjacent non-rotatable brake elements 40 and 42. A spring 57 is provided on both rods 14 between each pair of rotatable elements 34 and 35, one end of said springs acting on the projections 39 of the inner elements 34 urging same against the collars 56 while the other end of said springs act on the projections 39 of the outer elements 35 urging same against the heads 13 on the ends of said rods.

From the above description it will be noted that the release condition of the rotatable brake elements 34 and 35 is obtained by the action of springs 57 and defined by engagement of said elements with the collars 56 and heads 13 respectively on the rods 14. The release condition of the non-rotatable elements 40 is obtained by the action of springs 47 and defined by the stops 48, and the release condition of the non-rotatable element 41, 42 is obtained by the action of the caged springs 53 and defined by the interengagement of the two collars on the spring cage 25. These parts are so arranged that in the release condition of the several brake elements they are all disengaged from each other and at the same time securely held against vibration and therefore rattling.

It will be apparent from the above description that the disk brake mechanism as a whole is supported entirely on the wheels 7 near the periphery thereof and that the spools 8, bars 14 and rotatable brake elements 34 and 35 will rotate with said wheels, while the brake cylinder device 15 and non-rotatable brake elements 40, 41 and 42 which are carried by the bars 18 and in turn by the elements 22 journaled on the spools 8 are secured against rotation by the connection with transom 4 through the jaw 27 and tongue 28. Sufficient looseness is provided in the jaw 27 that the tongue 28 will not find therein upon vertical movement of the truck 1 relative to the wheels 7 due for instance to changes in load carried by the vehicle.

In operation, all parts of the brake mechanism are shown in the position which they will assume when the brakes are released and the wheels 7 are therefore free to rotate, and in this position there may be slight clearance between the ends of the piston rods 30 and 31 and the adjacent braking elements 40.

Let it be assumed that a vehicle truck equipped with this brake mechanism is in motion on a track way and it is desired to retard or stop the truck. In order to accomplish this fluid under pressure is supplied to the passages 33 in any desired manner and from thence to the several brake cylinders 29. Fluid under pressure thus supplied to the several brake cylinders acts between the pistons (not shown) therein and thereby operates said pistons to move the oppositely disposed piston rods 30 and 31 outwardly.

As the rods 30 and 31 are thus moved outwardly they first pick up the non-rotatable elements 40 and then slide said elements along the rods 18 into frictional engagement with the adjacent rotatable elements 34. The elements 34 are then picked up and slide along the rods 14 into frictional engagement with the adjacent non-rotatable elements 42 which are in turn picked up and slide along the rods 18 until the non-rotatable elements 41 frictionally engage the rotatable elements 35. The elements 35 are backed up by the heads 13 on rods 14 so that after the several rotatable and non-rotatable braking elements are moved into frictional contact as just described they are all subjected to a pressure equal to that supplied to the several brake cylinders 29 and acting on the pistons (not shown) therein, as a result of which the several non-rotatable elements act to retard or stop rotation of the several rotatable elements and this retarding force is applied to rods 14 and from thence through pools 8 to the wheels 7 and acts to stop rotation of said wheels. It will be noted that this braking force is transmitted directly from the braking mechanism through the spools 8 to the wheels 7 independently of the axle 6, and it will be further noted that the torque arms are limited in length only to the smallest diameter of the spools which are of relatively large diameter as compared to the axle 6, thereby avoiding excessive stressing of any of the parts.

A great deal of heat is developed at the friction faces of the interengaging rotatable and non-rotatable braking elements while they are in frictional braking engagement, and it is desirable that this heat be dissipated at least to such an extent as to prevent overheating of said elements. This is accomplished by exposing the faces opposite the braking surfaces of both the rotatable and non-rotatable braking elements to the atmosphere as a result of which there will be a constant flow of air over said faces as the vehicle is traveling. It will be noted that these faces of the elements 41 and 42 are exposed to the air currents due to said elements being spaced by the engaging thickened portions 50, hereinbefore described.

If desired, the rotatable brake elements 34 and 35 may be provided with spaced radial grooves 59 extending across their braking faces, the grooves in one face of said elements being staggered with respect to those in the opposite face, as clearly shown in Figs. 6 and 7 of the drawings. With this construction, the braking elements 34 and 35 will act as fans upon rotation to draw air from within the mechanism and expel it to the exterior, thus causing an increased flow of air across the braking faces of the several elements and as a consequence a greater dissipation of heat from said elements than will occur with the ungrooved elements shown in Figs. 1 and 2. It will be evident that the dissipation of heat due to the construction shown in Figs. 6 and 7 will be directly from the friction braking faces and this will reduce the amount which has to be dissipated from the opposite faces due to air currents incident to movement of the vehicle. A further advantage arises from the slotted rotatable elements in that metal ground or torn from the elements while braking will fall into the slots 59 and be expelled to the atmosphere thus maintaining the braking surfaces free of such material as would interfere with the braking efficiency thereof.

When the rotatable elements 34 and non-rotatable elements 40, 41 and 42 are operated to brake the wheels 7 as just described, it will be noted that the springs 47 are stretched, while the springs 57 and 53 are compressed, the portions 52 of the spring cages 25 being telescoped within the portions 51 to effect the compression of springs 53.

When it is desired to effect a release of the brakes after an application, the fluid under pressure is released from the brake cylinders 29 through the passages 33 whereupon the springs 47, 53 and 57 return the braking elements to their release position in which they are disengaged from each other, as hereinbefore described.

Due to the improved means above described for dissipating heat from the braking surfaces of the rotatable and non-rotatable braking elements, it is possible to employ one brake cylinder device, such as the brake cylinder device 15, for operating any number of such elements at both sides of the brake cylinder device, so as to thereby obtain whatever degree of braking is desired at the wheels 7.

A very important improvement resides in the construction whereby all the weight of the mechanism is carried by the wheels 7, and the braking torque is transmitted directly to the wheels, thus avoiding all possibility of breakage of the axle 6 or loosening of the wheels 7 on said axle.

It will be further noted that since all parts of the mechanism which surround the axle are made in halves, the mechanism may be applied to or removed from the axle 6 without disturbing the wheels 7. This feature is particularly desirable in case it becomes necessary to replace any part or parts of the mechanism.

The wheels 7 are generally pressed on to axle 6 and there may be a slight variation in the distance between the wheels of various wheel and axle assemblies, and therefore between the spools 8 secured to the wheels. However, this variation is held within such limits as not to affect in any way the installation or operation of the improved brake mechanism, since the ends of the rods 14 and 18 are adapted to be clamped in position in spools 8 and bearings 20 carried thereby, depending upon this spacing. The position of the spring cages 25 and therefore braking elements 41, 42 being dependent upon the bearing arms 22 will of course vary in the spacing of the wheels 7, but adequate clearance space is provided between said elements and the adjacent elements 34 and 35 to prevent engagement between these elements when the brakes are released.

While one illustrative embodiment of the invention and a modification thereof has been described in detail, it is not my intention to limit its scope to this embodiment or otherwise than by the terms of the appended claims.

Having now described my invention, what I claim as new and desire to secure by Letters Patent, is:

1. In a vehicle brake for a wheel and axle assembly of a vehicle truck, in combination, a substantially rigid structure separate from the axle and interposed between and secured to said wheels, one or more rotatable friction elements secured to and rotatable with said structure, one or more non-rotatable friction elements adapted to be moved into frictional engagement with said rotatable elements, means associated with said structure for at all times supporting said non-rotatable elements in cooperative relation with said rotatable elements, and means for effecting movement of said non-rotatable elements into and out of frictional engagement with said rotatable elements.

2. In a vehicle brake for a pair of wheels of a vehicle truck, in combination, a substantially rigid structure interposed between and secured to the inner faces of said wheels, the connection between said structure and wheels being closer to the periphery than to the axes of said wheels, one or more rotatable friction elements secured to and rotatable with said structure, one or more non-rotatable friction elements adapted to be moved into frictional engagement with said rotatable elements, means carried by said supporting structure for at all times supporting said non-rotatable elements in cooperative relation with said rotatable elements, and means for effecting movement of said non-rotatable elements into and out of frictional engagement with said rotatable elements.

3. In a vehicle brake for a wheel and axle assembly of a vehicle truck, in combination, a rigid structure independent of said axle and interposed between and rigidly secured to said wheels for rotation therewith, one or more rotatable friction elements secured to and rotatable with said structure, one or more non-rotatable friction elements adapted to be moved into frictional engagement with said rotatable elements, means journaled on said structure for at all times supporting said non-rotatable elements in cooperative relation with said rotatable elements, and means for effecting movement of said non-rotatable elements into and out of frictional braking engagement with said rotatable elements.

4. In a vehicle brake for a wheel and axle assembly of a vehicle truck, in combination, a rigid structure independent of said axle and disposed between said wheels and rigidly connected to said wheels between the treads thereof and the axle connections therewith for rotation with said wheels, annular rotatable friction elements disposed between said wheels in concentric relation therewith and secured to said structure for rotation with said wheels, annular non-rotatable friction elements disposed between said wheels and adapted to frictionally engage said rotatable elements, means carried by said structure for at all times supporting said non-rotatable elements, and means operative to move said non-rotatable elements into and out of frictional braking engagement with said rotatable elements.

5. In a vehicle brake for a wheel and axle assembly of a vehicle truck, in combination, a rigid structure independent of said axle and disposed between said wheels and rigidly connected to said wheels between the treads thereof and the axle connections therewith for rotation with said wheels, annular rotatable friction elements disposed between said wheels in concentric relation therewith and secured to said structure for rotation with said wheels, mechanism journaled on said structure, annular non-rotatable friction elements carried by said mechanism in cooperative relation with said rotatable elements and adapted to be moved on said mechanism into and out of frictional braking engagement with said rotatable elements, and means for effecting movement of said non-rotatable elements into and out of braking engagement with said rotatable elements.

6. In a vehicle brake for a pair of wheels secured to an axle in spaced relation, in combination, a substantially rigid structure disposed between and secured to the inner faces of said wheels and spaced from said axle, annular rotatable friction elements for braking said wheels carried by said structure and rotatable therewith and encircling said axle, annular, non-rotatable friction elements encircling said structure and adapted to frictionally engage said rotatable elements for braking same, means carried by said supporting structure for at all times supporting said non-rotatable elements in cooperative relation with said rotatable elements, and means for moving said non-rotatable elements into and out of braking engagement with said rotatable elements.

7. In a vehicle brake for a pair of wheels for a vehicle truck, in combination, a supporting element secured to the inner face of each of said wheels for rotation therewith, one or more annular, rotatable friction elements disposed between and secured to the supporting elements for rotation therewith, a bearing member journaled on each of said supporting elements, means for holding said bearing members against rotation, one or more annular, non-rotatable friction elements disposed between and carried by said bearing members, and means carried by said bearing members for moving said non-rotatable elements into frictional braking engagement with said rotatable elements.

8. In a vehicle brake for a pair of wheels for a vehicle truck, in combination, a supporting element secured to the inner face of each of said wheels for rotation therewith, a plurality of rods spaced from and arranged parallel to a line extending through the axes of said wheels with the opposite ends secured to said elements for rotation therewith, annular, rotatable friction elements mounted on said rods for rotation therewith, annular, non-rotatable friction elements encircling said rods and adapted to frictionally engage said rotatable elements for braking same, means journaled on said supporting elements and supporting said non-rotatable braking elements in cooperative relation with said rotatable braking elements, means securing said journaled means and thereby said non-rotatable elements against rotation, and means for moving said non-rotatable elements into and out of frictional braking engagement with said rotatable elements.

9. In a vehicle brake for a pair of wheels of a vehicle truck, in combination, a substantially rigid structure disposed between and rigidly connected to said wheels adjacent the peripheries thereof, said rigid structure comprising two rods disposed diametrically opposite each other on either side of a line passing through the axes of said wheels and parallel to said line, a plurality of annular rotatable friction elements mounted on said rods concentric with said wheels and rotatable with said rods, a plurality of annular, non-rotatable friction elements disposed in cooperative relation with and adapted to frictionally engage said rotatable elements, means journaled on said structure and supporting said non-rotatable elements, and means also supported by the journaled means for controlling movement of said non-rotatable elements into and out of frictional engagement with said rotatable elements.

10. In a vehicle brake for a pair of wheels of a vehicle truck, in combination, a substantially rigid structure disposed between and rigidly connected to said wheels adjacent the peripheries thereof, a plurality of annular friction elements secured to said structure for rotation therewith and slidable on said structure in the directions of said wheels, a plurality of non-rotatable annular friction elements encircling said structure, means journaled on said structure and supporting said non-rotatable elements in cooperative relation with said rotatable elements, and means also supported by said journaled means for effecting movement of said non-rotatable elements into and out of frictional engagement with said rotatable elements.

11. In a vehicle brake for a wheel and axle assembly of a vehicle truck, in combination, a plurality of interleaved annular rotatable and non-rotatable friction elements disposed between said wheels in concentric relation therewith and adapted to frictionally engage each other for braking said wheels, a rigid structure encircled by said elements and spaced from said axle and extending between said wheels and rigidly secured to said wheels for rotation therewith and connected to said rotatable elements for rotating same with said wheels, means journaled on said structure, means carried by said journaled means and disposed outside said braking elements and supporting said non-rotatable elements, means securing the journal carried means and thereby said non-rotatable braking elements against rotation, and means also supported by said journal carried means for controlling the braking operation of said braking elements.

12. In a vehicle brake for a pair of concentrically aligned wheels of a vehicle truck, in combination, a pair of oppositely disposed spool like members disposed between said wheels one secured to the inner face of each wheel in concentric relation therewith, two arms projecting radially from the inner end of each of said spools, two rods disposed parallel to each other and to the axes of said wheels connecting said arms on one spool to the arms on the other spool and rigidly secured to said arms, an annular friction element encircling and secured to said rods for rotation therewith, an element journaled on each of said spools between said arms and wheels, two bars disposed parallel to said rods outside the periphery of said braking element and connecting said journaled elements and secured thereto, an annular friction element disposed between and supported by said bars in cooperative relation with the friction element carrier by said rods, means for holding said bars and the friction element carried thereby against rotation, and means also carried by said bars for moving said friction elements into and out of frictional braking engagement.

13. In a vehicle brake for a pair of wheels mounted on an axle in spaced relation to each other, in combination, two oppositely disposed annular members encircling said axle between said wheels, one secured to the inner face of one wheel concentrically with the wheel and the other secured in a like manner to the inner face of the other wheel, a plurality of interleaved rotatable and non-rotatable annular friction elements disposed between said wheels and encircling said axle, said non-rotatable elements being adapted to be moved into frictional engagement with said rotatable elements for braking said rotatable elements, means secured to said two members and supporting said rotatable elements and operative to rotate same with said wheels, means journaled on said two members and supporting said non-rotatable elements in cooperative relation with said rotatable elements, fluid pressure operated brake cylinder means supported by said journaled means in cooperative relation with said non-rotatable elements and adapted to be operated by fluid under pressure for moving said non-rotatable elements into frictional braking engagement with said rotatable elements, and means securing said non-rotatable elements and brake cylinder means against rotation.

14. In a vehicle brake, in combination, a non-rotatable annular friction element, a pair of annular rotatable friction elements to be braked one disposed on either side of said non-rotatable element, means operative to move said rotatable elements into frictional engagement with the opposite faces of said non-rotatable element for braking said rotatable elements, said non-rotatable element having a passageway between the friction faces thereof for the passage of an air stream to dissipate heat from said elements, and said rotatable elements having a plurality of air conducting passages extending in a generally radial direction and adapted upon rotation of said rotatable elements to conduct a stream of air from the interior of said rotatable elements to the exterior thereof for also dissipating heat from said elements.

15. In a vehicle brake, in combination, a non-rotatable annular friction element, a pair of annular rotatable friction elements to be braked one disposed on either side of said non-rotatable element, means operative to move said rotatable elements into frictional engagement with the opposite faces of said non-rotatable element for braking said rotatable elements, said non-rotatable element having a passageway between the friction faces thereof for the passage of an air stream to dissipate heat from said elements, and said rotatable elements having a plurality of grooves extending across their braking faces in a generally radial direction and open at one side to said faces adapted upon rotation of said rotatable elements to conduct a stream of air across said braking faces.

16. In a vehicle brake for a pair of oppositely disposed wheels for a vehicle truck, in combination, friction braking means disposed between and in concentric relation with said wheels and connected to said wheels for rotation therewith, said braking means comprising an annular brake cylinder device disposed between said wheels and operative in opposite directions toward said wheels, a plurality of interleaved rotatable and non-rotatable annular friction elements disposed on each side of said brake cylinder device, means securing said rotatable elements to said wheels for rotation therewith, means supporting said non-rotatable elements and brake cylinder device in cooperative relation with each other and with said rotatable elements, and means securing said non-rotatable elements and brake cylinder device against rotation, said brake cylinder device being operative by fluid under pressure to move said non-rotatable elements into frictional braking engagement with said rotatable elements, and means operative upon the relief of fluid under pressure from said brake cylinder device for disengaging said elements from each other.

17. In a vehicle brake for a pair of spaced, concentrically aligned wheels for a vehicle truck, in combination, an annular brake cylinder device disposed between said wheels and comprising a plurality of fluid pressure operated brake cylinders arranged in a circle concentric with said wheels and operative in opposite directions toward said wheels, a plurality of non-rotatable, annular friction elements disposed at each side of and in concentric relation with said brake cylinder device for operation thereby, a plurality of rotatable annular friction elements interleaved with said non-rotatable elements at each side of said brake cylinder device, means rigidly connecting said rotatable elements with said wheels for rotation therewith, means journaled on said rigid connecting means and supporting said brake cylinder device and non-rotatable elements and secured against rotation, said brake cylinders being operative by fluid under pressure to move said non-rotatable and rotatable elements into frictional engagement with each other, and spring means for disengaging said rotatable and non-rotatable braking elements.

18. In combination, an annular member, a pair of spaced, annular non-rotatable friction elements disposed at one side of said member in concentric relation therewith and with one of said elements engaging said member, spring means acting on said one element urging same into engagement with said member, means secured against rotation, a collapsible assembly having one portion secured in said means and another relatively movable portion connected to said other friction element and movable to an extended position for positioning said other friction element, spring means acting on said collapsible assembly for moving the relatively movable part thereof to the extended position, a pair of rotatable friction elements adapted to be braked one being disposed between said two non-rotatable elements and the other being disposed at the outer face of said other non-rotatable element, stop means engageable by said rotatable elements for defining positions thereof in which they are out of engagement with said non-rotatable elements, spring means interposed between and acting on said rotatable elements urging same to said positions, and brake cylinder means in said annular member operative by fluid under pressure to move said non-rotatable and rotatable elements into frictional engagement against the resistance of the several spring means for braking said rotatable elements, said several spring means being operative upon the release of fluid under pressure from said brake cylinder means for moving said elements out of frictional engagement to their disengaged positions.

19. In a brake mechanism for a pair of laterally spaced wheels of a wheel and axle assembly, in combination, a supporting structure independent of said axle and extending between and rigidly secured to said wheels for rotation therewith, a supporting structure journaled on the first mentioned supporting structure, means for preventing rotation of the second mentioned supporting structure, a rotatable brake element carried by the first mentioned supporting structure, a non-rotatable brake element carried by the second mentioned supporting structure, and means carried by the second mentioned supporting structure for causing said brake elements to frictionally engage with each other.

20. In a brake mechanism for a pair of laterally spaced wheels of a wheel and axle assembly, rotatable brake elements and non-rotatable brake elements located between said wheels and movable into and out of frictional braking engagement with each other, means independent of said axle and carried by both of said wheels for supporting said rotatable brake elements, a non-rotatable structure journaled on said means for supporting said non-rotatable brake elements, and means carried by said structure for actuating said brake elements.

21. In a vehicle brake for a pair of oppositely disposed vehicle wheels of a wheel and axle assembly, in combination, a pair of spaced sets of interleaved rotatable and non-rotatable friction brake elements located between and carried by said wheels independent of said axle, said elements of each set being movable relative to the wheels into frictional braking engagement with each other, and means interposed between said sets of brake elements and carried by said wheels for actuating said sets of brake elements.

22. In a vehicle brake for a vehicle wheel and axle assembly, in combination, a pair of spaced sets of inter-leaved rotatable and non-rotatable brake elements encircling the axle of said assembly and carried at all times by the wheels of the assembly independently of said axle, said elements being adapted to frictionally engage with each other to produce braking action on said assembly, and means operative to effect the frictional engagement between the brake elements of each of said sets.

23. In a vehicle brake for a vehicle wheel and axle assembly, in combination, a pair of spaced sets of inter-leaved rotatable and non-rotatable brake elements encircling the axle of said assembly and carried by the wheels of the assembly independently of said axle, said elements being adapted to frictionally engage with each other to produce braking action on said assembly, and means interposed in the space between said sets of brake elements and carried by said wheels and operative to effect the frictional engagement between the brake elements of each of said sets.

24. In combination, an annular rotatable friction element adapted to be braked, an annular non-rotatable friction element disposed in cooperative relation with said rotatable element and adapted to be moved into and out of frictional engagement with said rotatable element, and a collapsible mechanism having one part fixed and having a relatively movable part secured to said non-rotatable element, said element having an extended position for disengaging said non-rotatable element from said rotatable element and being collapsible for permitting frictional engagement between said elements, and a spring in said mechanism for urging the movable part thereof to said extended position.

25. In a vehicle brake for a wheel and axle assembly of a vehicle truck, in combination, a rigid structure independent of said axle and interposed between and rigidly secured to said wheels for rotation therewith, one or more rotatable friction elements secured to and rotatable with said structure, one or more non-rotatable friction elements adapted to be moved into frictional engagement with said rotatable elements, means journaled on said structure for at all times supporting said non-rotatable elements in cooperative relation with said rotatable elements, and means carried by the journaled means for effecting movement of said non-rotatable elements into and out of frictional braking engagement with said rotatable elements.

26. In a vehicle brake for a wheel and axle assembly of a vehicle truck, in combination, a substantially rigid structure independent of said axle disposed between and secured to said wheels for rotation therewith, annular rotatable friction braking elements encircling said axle and carried by said structure for rotation therewith, annular non-rotatable friction braking elements encircling said axle for frictionally engaging said rotatable elements, means carried by said structure for at all times supporting said non-rotatable elements in cooperative relation with said rotatable elements, and means for moving said non-rotatable elements into and out of braking engagement with said rotatable elements.

27. In a vehicle brake for a wheel and axle assembly of a vehicle truck, in combination, a substantially rigid structure independent of said axle disposed between and secured to said wheels for rotation therewith, annular rotatable friction braking elements encircling said axle and carried by said structure for rotation therewith, annular non-rotatable friction braking elements encircling said axle for frictionally engaging said rotatable elements, means journaled on said structure for supporting said non-rotatable elements in cooperative relation with said rotatable elements, and means carried by said journaled means for moving said non-rotatable elements into and out of braking engagement with said rotatable elements.

28. In a vehicle brake for a wheel and axle assembly of a vehicle truck, in combination, a substantially rigid structure independent of said axle disposed between and secured to said wheels for rotation therewith, said rigid structure comprising a supporting element secured to each of said wheels between the tread portion thereof and the axle connection therewith, one or more annular, rotatable friction elements disposed between and secured to the supporting elements for rotation therewith, a bearing member journaled on each of said supporting elements, means for holding said bearing members against rotation, one or more annular, non-rotatable friction elements disposed between and carried by said bearing members, and means carried by said bearing members for moving said non-rotatable elements into frictional braking engagement with said rotatable elements.

29. In a vehicle brake for a wheel and axle assembly of a vehicle truck, in combination, two oppositely disposed members independent of and encircling said axle in concentric relation with said wheels, one of said members being secured to rotate with one of said wheels, and the other member being secured to rotate with the other wheel, a plurality of interleaved rotatable and non-rotatable annular friction elements disposed between said wheels and encircling said axle, said non-rotatable elements being adapted to be moved into frictional engagement with said rotatable elements for braking said rotatable elements, means secured to said two members and supporting said rotatable elements and operative to rotate same with said wheels, means journaled on said two members and supporting said non-rotatable elements in cooperative relation with said rotatable elements, fluid pressure operated brake cylinder means supported by said journal means in cooperative relation with said non-rotatable elements and adapted to be operated by fluid under pressure for moving said non-rotatable elements into frictional braking engagement with said rotatable elements, and means securing said non-rotatable elements and brake cylinder means against rotation.

JOSEPH C. McCUNE.